US010787970B2

(12) United States Patent
Sheridan et al.

(10) Patent No.: US 10,787,970 B2
(45) Date of Patent: *Sep. 29, 2020

(54) FLEXIBLE COUPLING FOR GEARED TURBINE ENGINE

(71) Applicant: United Technologies Corporation, Farmington, CT (US)

(72) Inventors: William G. Sheridan, Southington, CT (US); John R. Otto, Middletown, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 143 days.

This patent is subject to a terminal disclaimer.

(21) Appl. No.: 16/148,217

(22) Filed: Oct. 1, 2018

(65) Prior Publication Data

US 2019/0032570 A1 Jan. 31, 2019
US 2020/0232391 A9 Jul. 23, 2020

Related U.S. Application Data

(63) Continuation of application No. 15/862,716, filed on Jan. 5, 2018, now Pat. No. 10,087,850, which is a (Continued)

(51) Int. Cl.
*F02C 7/36* (2006.01)
*F02C 7/06* (2006.01)
*F02C 7/20* (2006.01)

(52) U.S. Cl.
CPC ............... *F02C 7/36* (2013.01); *F02C 7/06* (2013.01); *F02C 7/20* (2013.01);
(Continued)

(58) Field of Classification Search
CPC .......... F02C 7/36; F02C 7/20; F05D 2260/403
See application file for complete search history.

(56) References Cited

U.S. PATENT DOCUMENTS 5,433,584 A    7/1995    Amin et al.
5,433,674 A *   7/1995    Sheridan ............... F16H 1/2809
                                                                                475/346
(Continued)

FOREIGN PATENT DOCUMENTS

EP    1777380    10/2008
EP    2532841    12/2012

OTHER PUBLICATIONS

2003 NASA seal/secondary air system workshop. (2003). NASA/CP-2004-212963/VOL1. Sep. 1, 2004. pp. 1-408.
(Continued)

*Primary Examiner* — Shafiq Mian
(74) *Attorney, Agent, or Firm* — Carlson, Gaskey & Olds, P.C.

(57) ABSTRACT

A gas turbine engine includes a fan, a fan shaft coupled with the fan and arranged along an engine central axis, a gear system rotatably coupled to the fan shaft, and first and second flexible couplings supporting the gear system. The first flexible coupling and the second flexible coupling are subject to, with respect to the engine central axis, torsional motion and lateral motion. The first and second flexible couplings individually having a torsional stiffness under the torsional motion and a lateral stiffness under the lateral motion, and a ratio, of each of the first and second flexible couplings, of the torsional stiffness to the lateral stiffness is greater than or equal to 2.

28 Claims, 3 Drawing Sheets

Related U.S. Application Data continuation of application No. 14/766,766, filed as application No. PCT/US2014/016753 on Feb. 18, 2014, now Pat. No. 9,863,326.

(60) Provisional application No. 61/777,320, filed on Mar. 12, 2013.

(52) U.S. Cl.
CPC .................. *F05D 2260/403* (2013.01); *F05D 2260/40311* (2013.01); *F05D 2260/96* (2013.01)

(56) References Cited

U.S. PATENT DOCUMENTS

| | | | |
|---|---|---|---|
| 6,073,439 | A | 6/2000 | Beaven et al. |
| 6,223,616 | B1 | 5/2001 | Sheridan et al. |
| 6,260,351 | B1 | 7/2001 | Delano |
| 6,663,530 | B2 | 12/2003 | Poulin et al. |
| 6,735,954 | B2 | 5/2004 | MacFarlane et al. |
| 6,855,089 | B2 | 2/2005 | Poulin et al. |
| 6,895,741 | B2 | 5/2005 | Rago et al. |
| 7,104,918 | B2 | 9/2006 | Mitrovic |
| 7,144,349 | B2 | 12/2006 | Mitrovic |
| 7,223,197 | B2 | 5/2007 | Poulin et al. |
| 7,591,754 | B2 | 9/2009 | Duong et al. |
| 7,665,293 | B2 | 2/2010 | Wilson et al. |
| 7,704,178 | B2 | 4/2010 | Sheridan |
| 7,828,682 | B2 | 11/2010 | Smook |
| 7,841,163 | B2 | 11/2010 | Welch et al. |
| 7,841,165 | B2 | 11/2010 | Orlando |
| 7,926,260 | B2 | 4/2011 | Sheridan et al. |
| 7,959,532 | B2 | 6/2011 | Suciu et al. |
| 8,172,717 | B2 | 5/2012 | Lopez et al. |
| 8,297,217 | B2 * | 10/2012 | Hsu ...................... H01H 23/145 116/2 |
| 8,297,916 | B1 * | 10/2012 | McCune .................. F01D 15/12 415/124.1 |
| 8,297,917 | B1 † | 10/2012 | McCune |
| 9,631,558 | B2 * | 4/2017 | McCune .................... F02K 3/06 416/170 R |
| 2008/0097813 | A1 | 4/2008 | Orlando et al. |
| 2010/0013234 | A1 | 1/2010 | Sloth |
| 2010/0105516 | A1 | 4/2010 | Sheridan et al. |
| 2010/0150702 | A1 | 6/2010 | Sheridan |
| 2011/0106510 | A1 | 5/2011 | Poon |
| 2013/0287575 | A1 * | 10/2013 | McCune ............... F04D 29/325 416/170 R |
| 2013/0331224 | A1 * | 12/2013 | McCune ............... F04D 25/028 475/346 |

OTHER PUBLICATIONS

Berton, J.J. and Guynn, M.D. (2012). Multi-objective optimization of a turbofan for an advanced, single-aisle transport. NASA/TM-2012-217428. pp. 1-26.

Chapman, J.W. and Litt, J.S. (2017). Control design for an advanced geared turbofan engine. AIAA Joint Propulsion Conference 2017. Jul. 10, 2017-Jul. 12, 2017. Atlanta, GA. pp. 1-12.

Dalton, III., W.N. (2003). Ultra high bypass ratio low noise engine study. NASA/CR-2003-212523. Nov. 2003. pp. 1-187.

Edkins, D.P., Hirschkron, R., and Lee, R. (1972). TF34 turbofan quiet engine study. Final Report prepared for NASA. NASA-CR-120914. Jan. 1, 1972. pp. 1-99.

Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.

Greitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol 1. Dec. 1, 2010. NASA/CR-2010-216794/VOL1. pp. 1-187.

Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.

Guynn, M.D., Berton, J.J., Fisher, K.L., Haller, W.J., Tong, M. T., and Thurman, D.R. (2009). Analysis of turbofan design options for an advanced single-aisle transport aircraft. American Institute of Aeronautics and Astronautics. pp. 1-13.

Mavris, D.N., Schutte, J.S. (2016). Application of deterministic and probabilistic system design methods and enhancements of conceptual design tools for ERA project final report. NASA/CR-2016-219201. May 1, 2016. pp. 1-240.

McCracken, R.C. (1979). Quiet short-haul research aircraft familiarization document. NASA-TM-81149. Nov. 1, 1979. pp. 1-76.

Litt, J.S. (2018). Sixth NASA Glenn Research Center propulsion control and diagnostics (PCD) workshop. NASA/CP-2018-219891. Apr. 1, 2018. pp. 1-403.

Rotordynamic instability problems in high-performance turbomachinery. (1986). NASA conference publication 2443. Jun. 2-4, 1986.

Sargisson, D.F. (1985). Advanced propfan engine technology (APET) and single-rotation gearbox/pitch change mechanism. NASA Contractor Report—168113. R83AEB592. Jun. 1, 1985. pp. 1-476.

Singh, R. and Houser, D.R. (1990). Non-linear dynamic analysis of geared systems. NASA-CR-180495. Feb. 1, 1990. pp. 1-263.

Smith, C.E., Hirschkron, R., and Warren, R.E. (1981). Propulsion system study for small transport aircraft technology (STAT). Final report. NASA-CR-165330. May 1, 1981. pp. 1-216.

Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.

Hendricks, E.S. & Tong, Michael, T. (2012). Performance and weight estimates for an advanced open rotor engine. 48th Joint Propulsion Conference and Exhibit. Atlanta, GA, Jul. 30-Aug. 1, 2012.

Gunston, B. (2000). Jane's Aero-Engines. ISBN 0710614055.

Kandebo, S. (1998). Geared-turbofan engine design targets cost, complexity. Aviation Week & Space Technology; New York; Feb. 23, 1998.

Zalud, T. (1998). Gears put a new spin on turbofan performance. Machine Design, Nov. 5, 1998, 70(20) p. 104.

The International Search Report and Written Opinion for PCT Application No. PCT/US2014/016753, dated Jun. 16, 2014.

Supplementary European Search Report for European Patent Application No. 14774942 completed Oct. 5, 2016.

International Preliminary Report on Patentability for PCT Application No. PCT/US2014/016753 dated Sep. 24, 2015.

Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.

Johnston, R.P. and Hemsworth, M.C. (1978). Energy efficient engine preliminary design and integration studies. Jun. 1, 1978. pp. 1-28.

Awker, R.W. (1986). Evaluation of propfan propulsion applied to general aviation. NASA CR-175020. Mar. 1, 1986. pp. 1-140.

Howe, D.C. and Wynosky, T.A. (1985). Energy efficient engine program advanced turbofan nacelle definition study. NASA CR-174942. May 1, 1985. pp. 174.

Singh, B. (1986). Small engine component technology (SECT) study. NASA CR-175079. Mar. 1, 1986. pp. 1-102.

Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp. 1-187.

Anderson, R.D. (1985). Advanced Propfan Engine Technology (APET) definition study, single and counter-rotation gearbox/pitch change mechanism design. NASA CR-168115. Jul. 1, 1985. pp. 1-289.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.

(56) References Cited

OTHER PUBLICATIONS

Gliebe, P.R., Ho, P.Y., and Mani, R. (1995). UHB engine fan and broadband noise reduction study. NASA CR-198357. Jun. 1995. pp. 1-48.

Holcombe, V. (2003). Aero-Propulsion Technology (APT) task V low noise ADP engine definition study. NASA CR-2003-212521. Oct. 1, 2003. pp. 1-73.

Sutliff, D. (2005). Rotating rake turbofan duct mode measurement system. NASA TM-2005-213828. Oct. 1, 2005. pp. 1-34.

Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.

NASA Conference Publication. (1978). CTOL transport technology. NASA-CP-2036-PT-1. Jun. 1, 1978. pp. 1-531.

Gray, D.E. (1978). Energy efficient engine preliminary design and integration studies. NASA-CP-2036-PT-1. Nov. 1978. pp. 89-110.

Kandebo, S.W. (1993). Pratt & Whitney launches geared turbofan engine. Aviation Week & Space Technology, 148(8). p. 32-4.

Kandebo, S.W. (1993). Geared-Turbofan engine design targets cost, complexity. Aviation Week & Space Technology, 148(8). p. 34-5.

Davis, D.G.M. (1973). Variable-pitch fans: Progress in Britain. Flight International. Apr. 19, 1973. pp. 615-617.

Levintan, R.M. (1975). Q-Fan demonstrator engine. Journal of Aircraft. vol. 12( 8). Aug. 1975. pp. 658-663.

Aerospace Information Report. (2008). Advanced ducted propulsor in-flight thrust determination. SAE International AIR5450. Aug. 2008. p. 1-392.

Technical Report. (1975). Quiet Clean Short-haul Experimental Engine (QCSEE) UTW fan preliminary design. NASA-CR-134842. Feb. 1, 1975. pp. 1-98.

Daggett, D.L., Brown, S.T., and Kawai, R.T. (2003). Ultra-efficient engine diameter study. NASA/CR-2003-212309. May 2003. pp. 1-52.

Technical Report. (1975). Quiet Clean Short-haul Experimental Engine (QCSEE) Under-the-Wing (UTW) final design report. NASA-CR-134847. Jun. 1, 1977. pp. 1-697.

Bloomer, H.E., Loeffler, I.J., Kreim, W.J., and Coats, J.W. (1981). Comparison of NASA and contractor reslts from aeroacoustic tests of QCSEE OTW engine. NASA Technical Memorandum 81761. Apr. 1, 1981. pp. 1-30.

Bloomer, H.E. and Samanich, N.E. (1982). QCSEE under-the-wing engine acoustic data. NASA-TM-82691. May 1, 1982. pp. 1-28.

Bloomer, H.E. and Loeffler, I.J. (1982). QCSEE over-the-wing engine acoustic data. NASA-TM-82708. May 1, 1982. pp. 1-558.

Bloomer, H.E. and Samanich, N.E. (1982). QCSEE under-the-wing enging-wing-flap aerodynamic profile characteristics. NASA-TM-82890. Sep. 1, 1982. pp. 1-48.

Howard, D.F. (1976). QCSEE preliminary under the wing flight propulsion system analysis report. NASA CR-134868. Feb. 1, 1976. pp. 1-260.

Misel, O.W. (1977). QCSEE main reduction gears test program. NASA CR-134669. Mar. 1, 1977. pp. 1-222.

QCSEE Preliminary analyses and design report. vol. 1 (1974). NASA-CR-134838. Oct. 1, 1974. pp. 1-337.

QCSEE preliminary analyses and design report. vol. II. (1974). NASA-CR-134839. Oct. 1, 1974. pp. 340-630.

QCSEE under-the-wing engine composite fan blade design. (1975). NASA-CR-134840. May 1, 1975. pp. 1-51.

QCSEE the aerodynamic and preliminary mechanical design of the QCSEE OTW fan. (1975). NASA-CR-134841. Feb. 1, 1975. pp. 1-74.

QCSEE under-the-wing engine composite fan blade preliminary design test report. (1975). NASA-CR-134846. Sep. 1, 1975. pp. 1-56.

QCSEE over-the-wing final design report. (1977). NASA-CR-134848. Jun. 1, 1977. pp. 1-503.

QCSEE hamilton standard cam/harmonic drive variable pitch fan actuation system derail design report. (1976). NASA-CR-134852. Mar. 1, 1976. pp. 1-172.

QCSEE main reduction gears bearing development program final report. (1975). NASA-CR-134890. Dec. 1, 1975. pp. 1-41.

QCSEE under-the-wing engine digital control system design report. (1978). NASA-CR-134920. Jan. 1, 1978. pp. 1-309.

QCSEE the aerodynamic and mechanical design of the QCSEE under-the-wing fan. (1977). NASA-CR-135009. Mar. 1, 1977. pp. 1-137.

OCSEE under-the-wing engine composite fan blade final design test report. (1977). NASA-CR-135046. Feb. 1, 1977. pp. 1-55.

QCSEE over-the-wing propulsion system test report vol. III—mechanical performance. (1978). NASA-CR-135325. Feb. 1, 1978. pp. 1-112.

QCSEE ball spline pitch-change mechanism whirligig test report (1978). NASA-CR-135354. Sep. 1, 1978. pp. 1-57.

Quiet clean general aviation turbofan (QCGAT) technology study final report vol. I. (1975). NASA-CR-164222. Dec. 1, 1975. pp. 1-186.

Neitzel, R.E., Hirschkron, R. and Johnston, R.P. (1976). Study of unconventional aircraft engines designed for low energy consumption. NASA-CR-135136. Dec. 1, 1976. pp. 1-153.

Neitzel, R., Lee, R., and Chamay, A.J. (1973). Engine and installation preliminary design. Jun. 1, 1973. pp. 1-333.

Parametric study of STOL short-haul transport engine cycles and operational techniques to minimize community noise impact. NASA-CR-114759. Jun. 1, 1974. pp. 1-398.

Sowers, H.D. and Coward, W.E. (1978). QCSEE over-the-wing (OTW) engine acuostic design. NASA-CR-135268. Jun. 1, 1978. pp. 1-52.

Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.

Wendus, Follow-on technology requirement study for advanced subsonic transport (NASA 2003).†

\* cited by examiner
† cited by third party

FLEXIBLE COUPLING FOR GEARED TURBINE ENGINE

CROSS REFERENCE TO RELATED APPLICATIONS

This application is a continuation of U.S. patent application Ser. No. 15/862,716, filed Jan. 5, 2018, which is a continuation of U.S. patent application Ser. No. 14/766,766, filed Aug. 10, 2015, which is a national application of International Application No. PCT/US2014/016753, filed Feb. 18, 2014, which claims benefit of U.S. Provisional Application No. 61/777,320 filed Mar. 12, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section typically includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device such as an epicyclical gear assembly may be utilized to drive the fan section such that the fan section may rotate at a speed different than the turbine section. In such engine architectures, a shaft driven by one of the turbine sections provides an input to the epicyclical gear assembly that drives the fan section at a reduced speed. During flight, a geared engine can be subject to aero and maneuver loads that cause significant engine deflections. The loads can cause different types of deflection motions, as will be described in more detail below, between a gear system and static portions of the engine such that the gear system can have the tendency to misalign with respect to the engine central axis. Misalignment of the gear system can cause efficiency losses in the meshing between gear teeth in the gear system and reduced life from increases in concentrated stresses.

SUMMARY

A gas turbine engine according to an example of the present disclosure includes a fan shaft arranged along an engine central axis, and a frame that supports the fan shaft. The frame defines a frame lateral stiffness. A gear system is rotatably coupled to the fan shaft. The gear system has a gear reduction ratio that is greater than 2.3. A first, non-rotatable flexible coupling and a second, rotatable flexible coupling support the gear system. The first flexible coupling and the second flexible coupling being subject to, with respect to the engine central axis, parallel offset guided end motion. The second flexible coupling has a Stiffness D that is torsional stiffness under the parallel offset guided end motion, and the second flexible coupling has a ratio of frame lateral stiffness to Stiffness D that is in a range of 2 to 100.

In a further embodiment of any of the foregoing embodiments, the gear system has a sun gear in meshed engagement with multiple intermediate gears that are rotatably mounted on bearings in a non-rotatable carrier. Each intermediate gear is in meshed engagement with a rotatable ring gear. The sun gear is rotatably coupled to the fan shaft, and the first, non-rotatable flexible coupling is coupled with the non-rotatable carrier.

In a further embodiment of any of the foregoing embodiments, the gear system is coupled through an input shaft to a low pressure turbine. The low pressure turbine has a pressure ratio of greater than 5.

In a further embodiment of any of the foregoing embodiments, the fan has a fan pressure ratio of less than 1.45.

In a further embodiment of any of the foregoing embodiments, the gear system includes a sun gear in meshed engagement with multiple intermediate gears that are rotatably mounted on bearings in a rotatable carrier. Each intermediate gear is in meshed engagement with a non-rotatable ring gear. The sun gear is rotatably coupled to the fan shaft, and the first, non-rotatable flexible coupling is coupled with the non-rotatable ring gear.

In a further embodiment of any of the foregoing embodiments, the gear system is coupled through an input shaft to a low pressure turbine. The low pressure turbine has a pressure ratio of greater than 5.

In a further embodiment of any of the foregoing embodiments, the fan has a fan pressure ratio of less than 1.45.

A gas turbine engine according to an example of the present disclosure include a fan, a fan shaft coupled with the fan and arranged along an engine central axis, an input shaft, a high pressure turbine and a low pressure turbine. The low pressure turbine has a pressure ratio of greater than 5. A frame supports the fan shaft. The frame defines a frame lateral stiffness. A gear system is rotatably coupled with the fan shaft and also is rotatably coupled with the low pressure turbine through the input shaft. A first, non-rotatable flexible coupling and a second, rotatable flexible coupling supports the gear system. The first flexible coupling and the second flexible coupling are subject to, with respect to the engine central axis, parallel offset guided end motion. The second flexible coupling has a Stiffness D that is torsional stiffness under the parallel offset guided end motion, and the second flexible coupling has a ratio of frame lateral stiffness to Stiffness D that is in a range of 2 to 100.

In a further embodiment of any of the foregoing embodiments, the gear system has a sun gear in meshed engagement with multiple intermediate gears that are rotatably mounted on bearings in a non-rotatable carrier. Each intermediate gear is in meshed engagement with a rotatable ring gear. The sun gear is rotatably coupled to the fan shaft, and the first, non-rotatable flexible coupling is coupled with the non-rotatable carrier.

In a further embodiment of any of the foregoing embodiments, the gear system has a gear reduction ratio of greater than 2.3.

In a further embodiment of any of the foregoing embodiments, the fan has a fan pressure ratio of less than 1.45.

In a further embodiment of any of the foregoing embodiments, the gear system has a sun gear in meshed engagement with multiple intermediate gears that are rotatably mounted on bearings in a rotatable carrier. Each intermediate gear is in meshed engagement with a non-rotatable ring gear. The sun gear is rotatably coupled to the fan shaft, and the first, non-rotatable flexible coupling is coupled with the non-rotatable ring gear.

In a further embodiment of any of the foregoing embodiments, the gear system has a gear reduction ratio of greater than 2.3.

In a further embodiment of any of the foregoing embodiments, the fan has a fan pressure ratio of less than 1.45.

A gas turbine engine according to an example of the present disclosure includes a fan shaft arranged along an engine central axis, and a frame that supports the fan shaft. The frame defines a frame lateral stiffness. A gear system is rotatably coupled to the fan shaft. The gear system has a sun gear in meshed engagement with multiple intermediate gears that are rotatably mounted on bearings in a non-rotatable carrier. Each intermediate gear in meshed engagement with a rotatable ring gear, and the sun gear rotatably coupled to the fan shaft. A first, non-rotatable flexible coupling and a second, rotatable flexible coupling supports the gear system. The first flexible coupling and the second flexible coupling being subject to, with respect to the engine central axis, parallel offset guided end motion. The second flexible coupling has a Stiffness D that is torsional stiffness under the parallel offset guided end motion, and the second flexible coupling has a ratio of frame lateral stiffness to Stiffness D that is in a range of 2 to 100.

In a further embodiment of any of the foregoing embodiments, the fan has a fan pressure ratio of less than 1.45.

In a further embodiment of any of the foregoing embodiments, the gear system is coupled through an input shaft to a low pressure turbine. The low pressure turbine has a pressure ratio of greater than 5.

In a further embodiment of any of the foregoing embodiments, the gear system has a gear reduction ratio of greater than 2.3.

In a further embodiment of any of the foregoing embodiments, the gear system is coupled through an input shaft to a low pressure turbine. The low pressure turbine has a pressure ratio of greater than 5.

In a further embodiment of any of the foregoing embodiments, the gear system has a gear reduction ratio of greater than 2.3.

A gas turbine engine according to an example of the present disclosure includes a fan shaft arranged along an engine central axis, and a frame that supports the fan shaft. The frame defines a frame lateral stiffness. A gear system is rotatably coupled to the fan shaft. The gear system has a sun gear in meshed engagement with multiple intermediate gears that are rotatably mounted on bearings in a rotatable carrier. Each intermediate gear in meshed engagement with a non-rotatable ring gear, and the sun gear rotatably coupled to the fan shaft. A first, non-rotatable flexible coupling and a second, rotatable flexible coupling supports the gear system. The first flexible coupling and the second flexible coupling are subject to, with respect to the engine central axis, parallel offset guided end motion. The second flexible coupling has a Stiffness D that is torsional stiffness under the parallel offset guided end motion, and the second flexible coupling has a ratio of frame lateral stiffness to Stiffness D that is in a range of 2 to 100.

In a further embodiment of any of the foregoing embodiments, the fan has a fan pressure ratio of less than 1.45.

In a further embodiment of any of the foregoing embodiments, the gear system is coupled through an input shaft to a low pressure turbine. The low pressure turbine has a pressure ratio of greater than 5.

In a further embodiment of any of the foregoing embodiments, the gear system has a gear reduction ratio of greater than 2.3.

In a further embodiment of any of the foregoing embodiments, the gear system is coupled through an input shaft to a low pressure turbine. The low pressure turbine has a pressure ratio of greater than 5.

In a further embodiment of any of the foregoing embodiments, the gear system has a gear reduction ratio of greater than 2.3.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
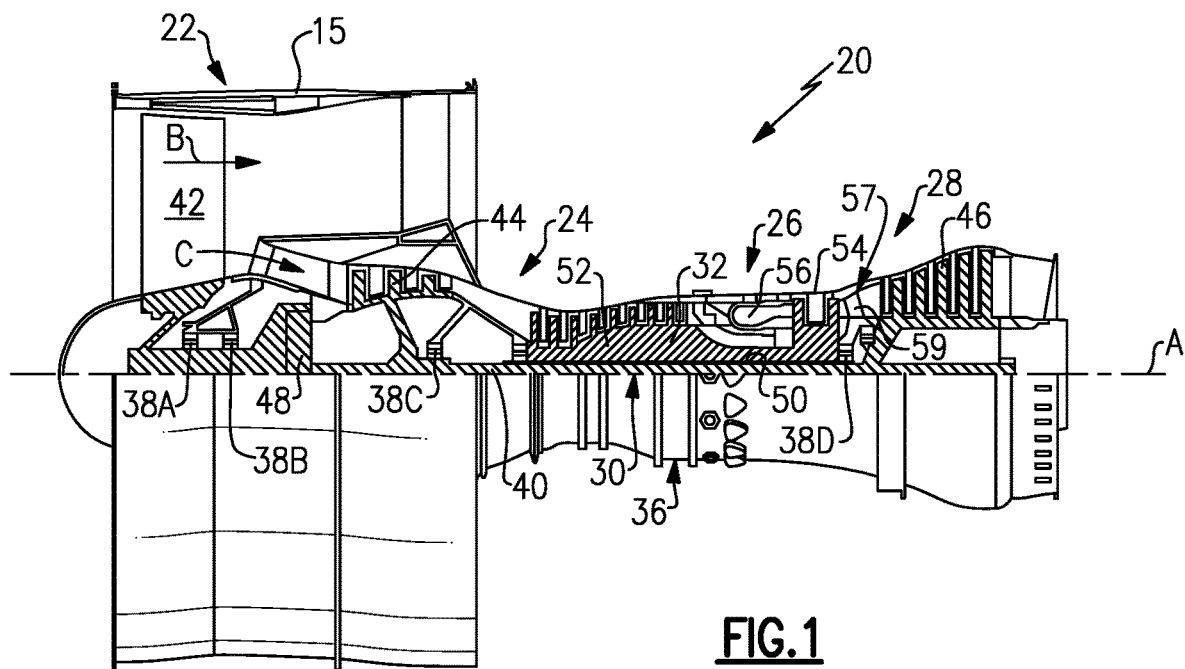
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines, including three-spool architectures.

The engine 20 includes a low speed spool 30 and a high speed spool 32 mounted for rotation about an engine central axis A relative to an engine static structure 36 via several bearing systems, shown at 38, 38B, 38C and 38D. It is to be understood that various bearing systems at various locations may alternatively or additionally be provided, and the location of bearing systems may be varied as appropriate to the application.

The low speed spool 30 includes an inner shaft 40 that interconnects a fan 42, a low pressure compressor 44 and a low pressure turbine 46. The inner shaft 40 is connected to the fan 42 through a speed change mechanism, which in this example is a gear system 48, to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing 38D in the turbine section 28. The inner shaft 40 and the outer shaft 50 are concentric and rotate via, for example, bearing systems 38C and 38D about the engine central axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and gear system 48 can be varied. For example, gear system 48 may be located aft of combustor section 26 or even aft of turbine section 28, and fan section 22 may be positioned forward or aft of the location of gear system 48.

The engine 20 in one example is a high-bypass geared engine. In a further example, the engine 20 has a bypass ratio that is greater than about six (6), with an example embodiment being greater than about ten (10), the gear system 48 is an epicyclic gear train, such as a planet or star gear system, with a gear reduction ratio of greater than about 2.3 and the low pressure turbine 46 has a pressure ratio that is greater than about five. In one disclosed embodiment, the bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The gear system 48 can be an epicycle gear train, such as a planet or star gear system, with a gear reduction ratio of greater than about 2.3:1. It is to be understood, however, that the above parameters are only exemplary and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

As described below, the gear system 48 in the engine 20 is mounted on flexible couplings 74 (FIG. 2) to reduce loads on the gear system 48 due to misalignment with respect to the engine central axis A. As a result, the embodiments hereafter described resolve the aforementioned issues associated with respect to misalignment in the gear system that would otherwise result in efficiency losses in the gear teeth in the gear system and reduced life from increases in concentrated stresses.

Figure 2:
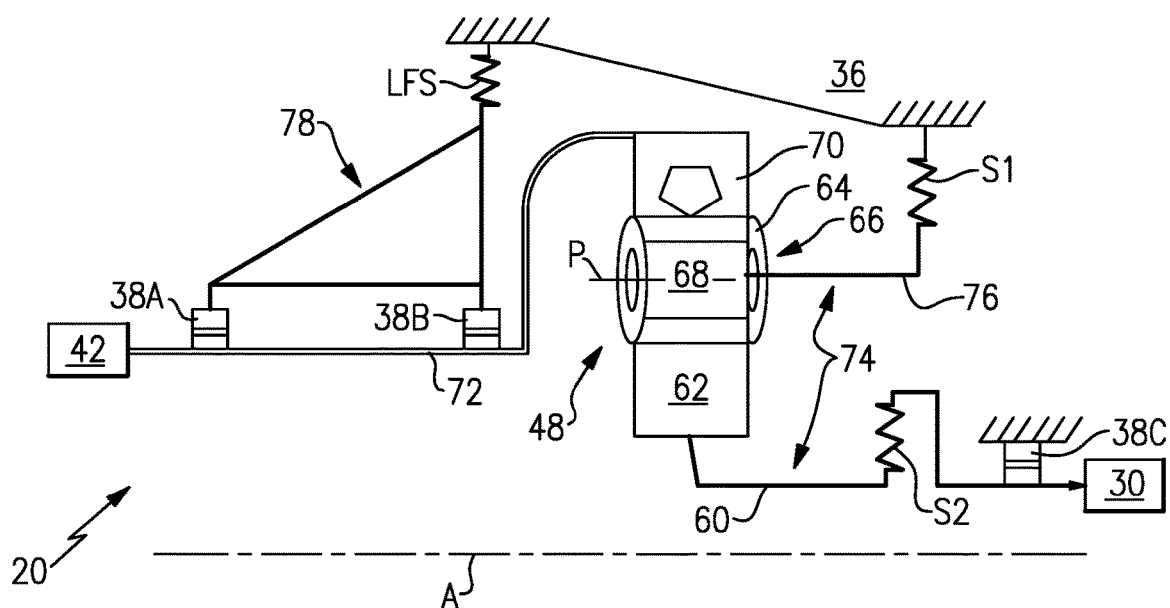
FIG. 2 illustrates selected portions of the engine of FIG. 1.
Figure 3:
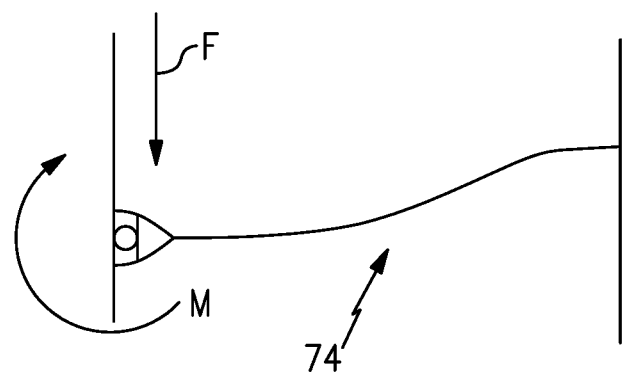
FIG. 3 schematically illustrates parallel offset guided end motion of a flexible coupling in the engine of FIG. 1.
Figure 4:
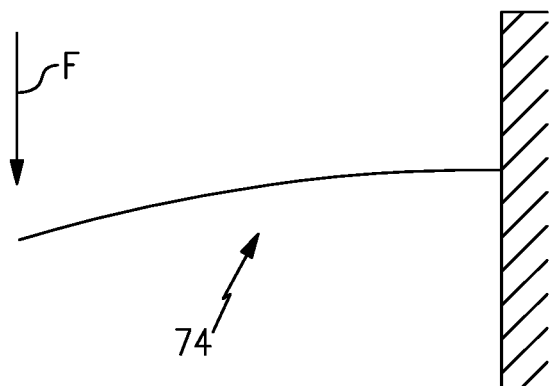
FIG. 4 schematically illustrates cantilever beam free end motion of a flexible coupling in the engine of FIG. 1.
Figure 5:
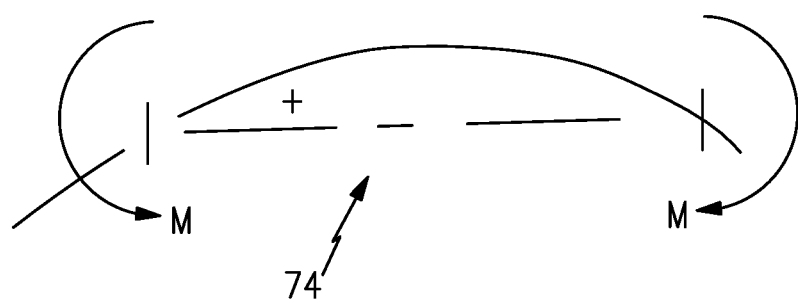
FIG. 5 schematically illustrates angular misalignment no offset motion of a flexible coupling in the engine of FIG. 1.
Figure 6:
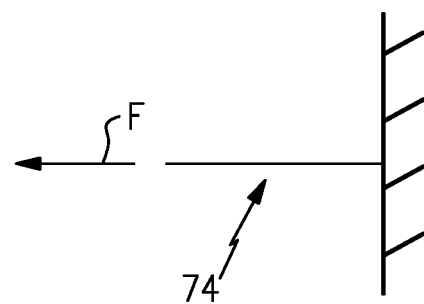
FIG. 6 schematically illustrates axial motion of a flexible coupling in the engine of FIG. 1.

FIG. 2 schematically shows a portion of the engine 20 around the gear system 48. The gear system 48 is driven by the low speed spool 30 through an input shaft 60. The input shaft 60 transfers torque to the gear system 48 from the low speed spool 30. In this example, the input shaft 60 is coupled to a sun gear 62 of the gear system 48. The sun gear 62 is in meshed engagement with multiple intermediate gears 64, of which the illustrated intermediate gear 64 is representative. Each intermediate gear 64 is rotatably mounted in a carrier 66 by a respective rolling bearing 68, such as a journal bearing. Rotary motion of the sun gear 62 urges each intermediate gear 64 to rotate about a respective longitudinal axis P.

Each intermediate gear 64 is also in meshed engagement with a ring gear 70 that is rotatably coupled to a fan shaft 72 in this example. Since the intermediate gears 64 mesh with the rotating ring gear 70 and the rotating sun gear 62, the intermediate gears 64 rotate about their own axes to drive the ring gear 70 to rotate about engine central axis A. The rotation of the ring gear 70 is conveyed to the fan 42 through the fan shaft 72 to thereby drive the fan 42 at a lower speed than the low speed spool 30. In this example, the carrier 66 is fixed (non-rotating) and the ring gear 70 is rotatable such that the intermediate gears 64 serve as star gears. In any of the examples herein, the carrier 66 can alternatively be rotatable and the ring gear 70 can be fixed (non-rotating) such that the intermediate gears 64 serve as planet gears and the carrier is coupled to rotatably drive the fan shaft 72 and the fan 42. Thus, the flexible support 76 described herein can be coupled either to the fixed carrier (star system) or to the fixed ring gear (planetary system), depending upon the configuration of the gear system 48.

The gear system 48 is at least partially supported by flexible couplings 74. In FIG. 2, the flexible couplings 74 include a first flexible coupling, which is flexible support 76 that is coupled with the carrier 66 and a second flexible coupling, which is the input shaft 60 that supports the gear system 48 with respect to bearing system 38C. The flexible support 76 is static (fixed, non-rotating) and supports the gear system 48 with respect to the static structure 36.

The static structure 36 includes a bearing support static structure 78, which can also be termed a "K-frame." In this example, the bearing support static structure 78 is the support structure forward of the gear system 48 that supports the bearings 38A and 38B and the fan shaft 72. The bearing support static structure 78 defines a lateral frame stiffness, represented as "LFS" in FIG. 2. The lateral frame stiffness LFS serves as a reference stiffness from which the different types of stiffnesses, described below, of the flexible couplings 74 are defined. The term "lateral" or variations thereof as used herein refers to a perpendicular direction with respect to the engine central axis A. It is further to be understood that "stiffness" as used herein can alternatively be termed "spring rate." The stiffnesses, or spring rates, are in units of pounds per inch, although conversions can be used to represent the units of pounds per inch in other units.

The flexible couplings 74 each have one or more specific stiffnesses A, B, C, D and E, generally represented in FIG. 2 at S1 and S2. Each of the specific stiffnesses A, B, C, D and E are defined with respect to the lateral frame stiffness LFS and a different type of motion that the flexible couplings 74 can be subject to with respect to the engine central axis A. For example, as summarized in Table 1 below, the types of motion include Motion I, Motion II, Motion III, Motion IV, or combinations thereof, where Motion I is parallel offset guided end motion, Motion II is cantilever beam free end motion and Motion III is angular misalignment no offset motion and Motion IV is axial motion. Stiffness A is axial stiffness under Motion IV, Stiffness B is radial stiffness under Motion II, Stiffness C is radial stiffness under Motion I, Stiffness D is torsional stiffness under Motion I, and Stiffness E is angular stiffness under Motion III. Terms such as "radial," "axial," "forward" and the like are relative to the engine central axis A.

Figure 7:
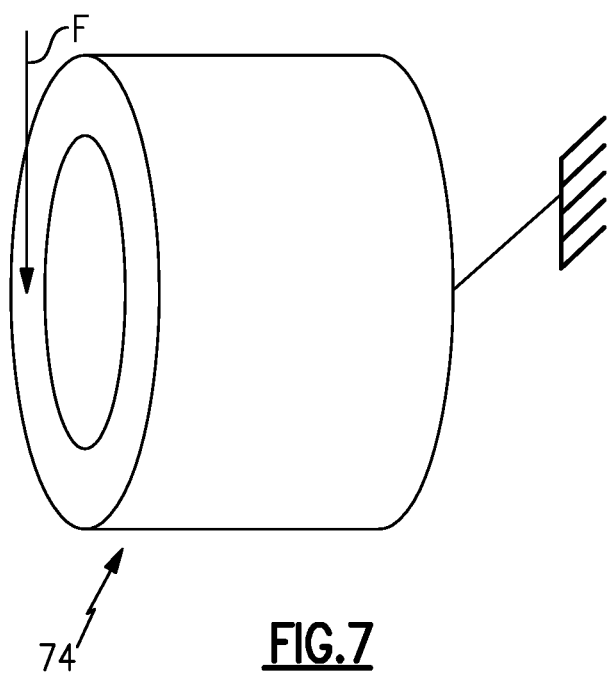
FIG. 7 schematically illustrates torsional motion of a flexible coupling in the engine of FIG. 1.

Motion I, Motion II, Motion III, Motion IV are schematically shown in force coupling diagrams in, respectively, FIG. 3, FIG. 4, FIG. 5 and FIG. 6, where F represents an applied load or force and M represents a resulting moment of force. An applied force can also result in torsional motion, as represented in FIG. 7, as well as lateral motion. The term "torsion" or variations thereof as used herein refers to a twisting motion with respect to the engine central axis A. In this regard, one or both of the flexible couplings 74 also has a torsional stiffness TS and a lateral stiffness LS defined with respect to the lateral frame stiffness LFS.

TABLE 1

Types of Motion

| Type of Motion | Description |
| --- | --- |
| I | parallel offset guided end motion |
| II | cantilever beam free end motion |
| III | angular misalignment no offset motion |
| IV | axial motion |

In one example, the torsional stiffness TS and the lateral stiffness LS of one or both of the flexible couplings 74 are selected in accordance with one another to reduce loads on the gear system 48 from misalignment of the gear system 48 with respect to the engine central axis A. That is, the torsional stiffness TS and the lateral stiffness LS of the flexible support 76 can be selected in accordance with one another, and the torsional stiffness TS and the lateral stiffness LS of the input shaft 60 can be selected in accordance with one another.

For example, a ratio of TS/LS is greater than or equal to about 2 for the flexible support 76, the input shaft 60 or both individually. The ratio of greater than or equal to about 2 provides the flexible couplings 74 with a high torsional stiffness relative to lateral stiffness such that the flexible coupling 74 is permitted to deflect or float laterally with relatively little torsional wind-up. The nomenclature of a ratio represented as value 1/value 2 represents value 1 divided by value 2, although the ratios herein can also be equivalently represented by other nomenclatures. As an example, the ratio can also be equivalently represented as 2:1 or 2/1. The stiffnesses herein may be provided in units of pounds per inch, although the ratios herein would be equivalent for other units.

The stiffnesses A, B, C, D, E, TS and LS can also be utilized individually or in any combination to facilitate the segregation of the gear system 48 from vibrations and other transients to reduce loads on the gear system 48 from misalignment of the gear system 48 with respect to the engine central axis A. The following examples, further illustrate selected stiffnesses A, B, C, D, E defined with respect to the frame lateral stiffness LFS.

In one example, a ratio of FLS/Stiffness A of the flexible support 76 is in a range of 6-25, and a ratio of FLS/Stiffness A of the input shaft 60 is in a range of 28-200.

In another example, a ratio of FLS/Stiffness B of flexible support 76 is in a range of 10-40, and a ratio FLS/Stiffness B of the input shaft 60 is in a range of 33-1000.

In another example, a ratio of FLS/Stiffness C of the flexible support 76 is in a range of 1.5-7, and a ratio FLS/Stiffness C of the input shaft 60 is in a range of 16-100.

In another example, a ratio of FLS/Stiffness D of the flexible support 76 is in a range of 0.25-0.5, and a ratio FLS/Stiffness D of the input shaft 60 is in a range of 2-100.

In another example, a ratio of FLS/Stiffness E of the flexible support 76 is in a range of 6-40, and a ratio FLS/Stiffness E of the input shaft 60 is in a range of 4-500.

In another example, one or more of Stiffness A, Stiffness B, Stiffness C and Stiffness D of the flexible support 76 is greater than, respectively, Stiffness A, Stiffness B, Stiffness C and Stiffness D of the input shaft 60.

In a further example, the flexible support 76 and the input shaft 60 have any combination of some or all of the above-described ratios. The ratios are summarized in Table 2 below.

TABLE 2

Ratio Ranges for First and Second Couplings

| | | Ratio FLS/Stiffness | |
| --- | --- | --- | --- |
| Type of Stiffness | Type of Motion | flexible support 76 | input shaft 60 |
| A | IV | 6-25 | 28-200 |
| B | II | 10-40 | 33-1000 |
| C | I | 1.5-7 | 16-100 |
| D | I | 0.25-0.5 | 2-100 |
| E | III | 6-40 | 4-500 |

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:
   a fan;
   a fan shaft coupled with the fan and arranged along an engine central axis;
   a gear system rotatably coupled to the fan shaft; and
   first and second flexible couplings supporting the gear system, the first flexible coupling and the second flexible coupling being subject to, with respect to the engine central axis, torsional motion and lateral motion, the first and second flexible couplings individually having a torsional stiffness under the torsional motion and a lateral stiffness under the lateral motion, and a ratio, of each of the first and second flexible couplings, of the torsional stiffness to the lateral stiffness is greater than or equal to 2.

2. The gas turbine engine as recited in claim 1, wherein the gear system includes a sun gear in meshed engagement with multiple intermediate gears that are rotatably mounted on bearings in a non-rotatable carrier, each intermediate gear is in meshed engagement with a rotatable ring gear, the sun gear is rotatably coupled to the fan shaft, and the first flexible coupling is coupled with the non-rotatable carrier.

3. The gas turbine engine as recited in claim 2, wherein the gear system is coupled through an input shaft to a low pressure turbine, the low pressure turbine having a pressure ratio of greater than 5.

4. The gas turbine engine as recited in claim 3, wherein the fan has a fan pressure ratio of less than 1.45.

5. The gas turbine engine as recited in claim 1, wherein the gear system includes a sun gear in meshed engagement with multiple intermediate gears that are rotatably mounted on bearings in a rotatable carrier, each intermediate gear is in meshed engagement with a non-rotatable ring gear, the sun gear is rotatably coupled to the fan shaft, and the first flexible coupling is coupled with the non-rotatable ring gear.

6. The gas turbine engine as recited in claim 5, wherein the gear system is coupled through an input shaft to a low pressure turbine, the low pressure turbine having a pressure ratio of greater than 5.

7. The gas turbine engine as recited in claim 6, wherein the fan has a fan pressure ratio of less than 1.45.

8. A gas turbine engine comprising:
a fan;
a fan shaft coupled with the fan and arranged along an engine central axis;
a gear system rotatably coupled to the fan shaft; and
a first, non-rotatable flexible coupling and a second, rotatable flexible coupling supporting the gear system, the first flexible coupling and the second flexible coupling being subject to, with respect to the engine central axis, torsional motion and lateral motion,
the first and second flexible couplings individually having a torsional stiffness under the torsional motion and a lateral stiffness under the lateral motion, and a ratio, of each of the first and second flexible couplings, of the torsional stiffness to the lateral stiffness is greater than or equal to 2.

9. The gas turbine engine as recited in claim 8, wherein the gear system includes a sun gear in meshed engagement with multiple intermediate gears that are rotatably mounted on bearings in a non-rotatable carrier, each intermediate gear is in meshed engagement with a rotatable ring gear, the sun gear is rotatably coupled to the fan shaft, and the first, non-rotatable flexible coupling is coupled with the non-rotatable carrier.

10. The gas turbine engine as recited in claim 9, wherein the gear system has a gear reduction ratio of greater than 2.3.

11. The gas turbine engine as recited in claim 10, wherein the fan has a fan pressure ratio of less than 1.45.

12. The gas turbine engine as recited in claim 8, wherein the gear system includes a sun gear in meshed engagement with multiple intermediate gears that are rotatably mounted on bearings in a rotatable carrier, each intermediate gear is in meshed engagement with a non-rotatable ring gear, the sun gear is rotatably coupled to the fan shaft, and the first, non-rotatable flexible coupling is coupled with the non-rotatable ring gear.

13. The gas turbine engine as recited in claim 12, wherein the gear system has a gear reduction ratio of greater than 2.3.

14. The gas turbine engine as recited in claim 13, wherein the fan has a fan pressure ratio of less than 1.45.

15. A gas turbine engine comprising:
a fan;
a fan shaft coupled with the fan and arranged along an engine central axis;
a gear system rotatably coupled to the fan shaft, the gear system having a gear reduction ratio that is greater than 2.3; and
first and second flexible couplings supporting the gear system, the first flexible coupling and the second flexible coupling being subject to, with respect to the engine central axis, torsional motion and lateral motion,
at least one of the first and second flexible couplings having a torsional stiffness under the torsional motion and a lateral stiffness under the lateral motion, and a ratio of the torsional stiffness to the lateral stiffness is greater than or equal to 2.

16. The gas turbine engine as recited in claim 15, wherein the gear system includes a sun gear in meshed engagement with multiple intermediate gears that are rotatably mounted on bearings in a non-rotatable carrier, each intermediate gear is in meshed engagement with a rotatable ring gear, the sun gear is rotatably coupled to the fan shaft, and the first flexible coupling is coupled with the non-rotatable carrier.

17. The gas turbine engine as recited in claim 16, wherein the fan has a fan pressure ratio of less than 1.45.

18. The gas turbine engine as recited in claim 17, wherein the gear system is coupled through an input shaft to a low pressure turbine, the low pressure turbine having a pressure ratio of greater than 5.

19. The gas turbine engine as recited in claim 18, wherein the gear system includes a sun gear in meshed engagement with multiple intermediate gears that are rotatably mounted on bearings in a rotatable carrier, each intermediate gear is in meshed engagement with a non-rotatable ring gear, the sun gear is rotatably coupled to the fan shaft, and the first flexible coupling is coupled with the non-rotatable ring gear.

20. The gas turbine engine as recited in claim 19, wherein the fan has a fan pressure ratio of less than 1.45.

21. The gas turbine engine as recited in claim 20, wherein the gear system is coupled through an input shaft to a low pressure turbine, the low pressure turbine having a pressure ratio of greater than 5.

22. A gas turbine engine comprising:
a fan;
a fan shaft coupled with the fan and arranged along an engine central axis;
an input shaft;
a high pressure turbine and a low pressure turbine, the low pressure turbine having a pressure ratio of greater than 5;
a gear system rotatably coupled with the fan shaft and also rotatably coupled with the low pressure turbine through the input shaft; and
a gear system rotatably coupled to the fan shaft; and
first and second flexible couplings supporting the gear system, the first flexible coupling and the second flexible coupling being subject to, with respect to the engine central axis, torsional motion and lateral motion,
at least one of the first and second flexible couplings having a torsional stiffness under the torsional motion and a lateral stiffness under the lateral motion, and a ratio of the torsional stiffness to the lateral stiffness is greater than or equal to 2.

23. The gas turbine engine as recited in claim 22, wherein the gear system includes a sun gear in meshed engagement with multiple intermediate gears that are rotatably mounted on bearings in a non-rotatable carrier, each intermediate gear is in meshed engagement with a rotatable ring gear, the sun gear is rotatably coupled to the fan shaft, and the first flexible coupling is coupled with the non-rotatable carrier.

24. The gas turbine engine as recited in claim 23, wherein the fan has a fan pressure ratio of less than 1.45.

25. The gas turbine engine as recited in claim 24, wherein the gear system has a gear reduction ratio of greater than 2.3.

26. The gas turbine engine as recited in claim 22, wherein the gear system includes a sun gear in meshed engagement with multiple intermediate gears that are rotatably mounted on bearings in a rotatable carrier, each intermediate gear is in meshed engagement with a non-rotatable ring gear, the sun gear is rotatably coupled to the fan shaft, and the first flexible coupling is coupled with the non-rotatable ring gear.

27. The gas turbine engine as recited in claim 26, wherein the fan has a fan pressure ratio of less than 1.45.

28. The gas turbine engine as recited in claim 27, wherein the gear system has a gear reduction ratio of greater than 2.3.

\* \* \* \* \*